United States Patent
Wang et al.

(10) Patent No.: US 10,270,071 B2
(45) Date of Patent: Apr. 23, 2019

(54) SYSTEMS AND METHODS FOR VOLTAGE REGULATED BATTERY BACKUP MANAGEMENT

(71) Applicants: Ligong Wang, Austin, TX (US); John J. Breen, Harker Heights, TX (US)

(72) Inventors: Ligong Wang, Austin, TX (US); John J. Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 15/255,951

(22) Filed: Sep. 2, 2016

(65) Prior Publication Data

US 2018/0067528 A1    Mar. 8, 2018

(51) Int. Cl.
| | |
|---|---|
| *G06F 1/00* | (2006.01) |
| *H01M 2/10* | (2006.01) |
| *H02J 1/00* | (2006.01) |
| *H01M 10/42* | (2006.01) |
| *H01M 10/44* | (2006.01) |
| *H01M 10/48* | (2006.01) |
| *H02J 7/00* | (2006.01) |
| *H02J 9/06* | (2006.01) |

(52) U.S. Cl.
CPC ....... *H01M 2/1077* (2013.01); *H01M 10/425* (2013.01); *H01M 10/441* (2013.01); *H01M 10/482* (2013.01); *H02J 1/00* (2013.01); *H02J 7/0014* (2013.01); *H02J 9/06* (2013.01); *H01M 2010/4271* (2013.01); *H01M 2220/10* (2013.01)

(58) Field of Classification Search
CPC .. G06F 1/263; H01M 2/1077; H01M 2220/10
USPC .......................................................... 713/300
See application file for complete search history.

(56) References Cited

U.S. PATENT DOCUMENTS

| | | |
|---|---|---|
| 4,143,283 A | 3/1979 | Graf et al. |
| 4,209,710 A | 6/1980 | Quarton |
| 5,430,365 A | 7/1995 | Taylor et al. |
| 5,701,068 A | 12/1997 | Baer et al. |
| 5,737,204 A | 4/1998 | Brown |
| 5,764,028 A | 6/1998 | Freiman et al. |
| 5,777,454 A | 7/1998 | McAndrews et al. |
| 6,018,229 A | 1/2000 | Mitchell et al. |
| 6,181,029 B1 | 1/2001 | Berglund et al. |
| 6,204,573 B1 | 3/2001 | Green et al. |
| 6,232,749 B1 | 5/2001 | Hewes et al. |

(Continued)

OTHER PUBLICATIONS

Park, "Open Compute Project", Data Center V1.0, Apr. 7, 2011, 15 pgs.

(Continued)

*Primary Examiner* — Xuxing Chen
(74) *Attorney, Agent, or Firm* — Egan Peterman Enders Huston

(57) ABSTRACT

Systems and methods are provided that employ voltage regulated management of battery backup for information handling systems, such as blade server systems. The disclosed systems and methods may be implemented for an information handling system using multiple battery subsystems in a single battery backup unit (BBU) or using multiple battery backup units, and the multiple battery subsystems or BBUs may be individually controlled and managed using defined protocols and architectures.

20 Claims, 7 Drawing Sheets

(56) References Cited

U.S. PATENT DOCUMENTS

| | | | |
|---|---|---|---|
| 6,509,657 B1 | 1/2003 | Wong et al. | |
| 7,595,609 B2 | 9/2009 | Wang et al. | |
| 7,925,906 B2 | 4/2011 | Ranganathan et al. | |
| 8,395,489 B2* | 3/2013 | Abe | B60R 25/1018 235/449 |
| 8,648,568 B2* | 2/2014 | McCollum | G06F 1/26 307/48 |
| 8,843,772 B2 | 9/2014 | Hormuth | |
| 8,995,670 B2 | 3/2015 | Lambert et al. | |
| 2004/0163123 A1* | 8/2004 | Okada | H04N 7/173 725/116 |
| 2010/0299548 A1* | 11/2010 | Chadirchi | G06F 1/263 713/340 |
| 2011/0078470 A1* | 3/2011 | Wang | G06F 1/28 713/320 |
| 2013/0108905 A1* | 5/2013 | Murakami | H01M 2/1077 429/90 |
| 2013/0234667 A1 | 9/2013 | Norton | |
| 2013/0278065 A1* | 10/2013 | Kawamoto | H02J 4/00 307/52 |
| 2015/0067362 A1* | 3/2015 | Sultenfuss | G06F 1/3296 713/320 |
| 2015/0318685 A1 | 11/2015 | Hsieh et al. | |
| 2016/0344003 A1* | 11/2016 | Yamada | H01M 2/1077 |
| 2017/0031404 A1* | 2/2017 | Yamamoto | G06F 1/28 |
| 2017/0033408 A1* | 2/2017 | O'Hora | H01M 10/425 |

OTHER PUBLICATIONS

Sarti, "Open Compute Project", Battery Cabinet Hardware V1.0, Apr. 7, 2011, 13 pgs.

* cited by examiner

SYSTEMS AND METHODS FOR VOLTAGE REGULATED BATTERY BACKUP MANAGEMENT

FIELD

This application relates to information handling systems, and more particularly to battery backup regulation in an information handling system environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Multiple server blades may be grouped together in a server rack. During operation of the server rack, a baseboard management controller (BMC) of each given server monitors real time power consumption of the given server and issues commands to limit CPU, memory, storage, networking power consumption below an assigned power cap for the given server by adjusting operating conditions of the given blade server.

SUMMARY

Disclosed herein are systems and methods that employ voltage regulated management of battery backup for information handling systems, such as blade server systems. The disclosed systems and methods may be implemented in one embodiment as a closed-loop voltage regulated battery solution that may be adapted to follow changes in battery backup unit (BBU) and information handling system technologies, including changes in cost, tenet of consistence in generations, and improvements with emerging battery technologies. In one embodiment, a configurable backup battery solution may be implemented for an information handling system using multiple battery subsystems in a single BBU or using multiple battery backup units, e.g., such as multiple individual BBUs that are associated with multiple respective server blades. In either case, the multiple battery subsystems or BBUs may be individually controlled and managed together using defined protocols and architectures, and may be coordinated in one embodiment by inter-battery subsystem or inter-BBU communications across a communication path such as data bus or signal lines. This allows each battery subsystem or BBU to manage its own output voltage and total power may be adjusted through a communication bus and/or using defined algorithms. In a further embodiment, problems with cell-type and aging factor compatibilities may be advantageously solved where different types and/or ages of battery cells are integrated into a single BBU or battery system.

In one exemplary embodiment, the role and operation of a single conventional multi-cell BBU may be replaced by multiple coordinated battery subsystems or by smaller BBUs that each have fewer battery cells than the conventional larger BBU. For example, a larger conventional 4-battery cell BBU may be replaced with two smaller 2-battery cell battery subsystems or BBUs having their power outputs coupled together in parallel and/or series. In such an example, each of the multiple smaller battery subsystems or BBUs may be provided with its own battery management unit (BMU) or other battery management processing device that may implement battery Gas Gauge logic, and the battery management processing devices of the individual BBUs may be communicatively coupled together through a digital or analog communication path, including communication bus such as single-digital communication bus, 2-wire $I^2C$/SMBus/PMBus communication bus, or a signal active analog line. Each of the battery management processing devices may be designated as (or otherwise act as) hosts, and may respond to system requests depending on identification (ID) assignments and/or locations. With less cells in one pack, cell balancing is much easier to achieve in one embodiment by Gas Gauges in each smaller battery cell or BBU than it would be in a single larger BBU that has more battery cells. In another embodiment, problems conventionally encountered with cell and aging factor compatibilities may be solved for system architectures having different types or aged cells integrated in one battery system.

In one exemplary embodiment, a battery system architecture may be provided that supports both current/power sharing and concurrent use of different battery technologies for extended battery life. In one example, when two or more types of cells are presented in one system, higher output voltage may be set by default values or by adjustment through a communication path (e.g., such as I2C/SMBus/PMBus bus) to achieve optimized performance in alignment with system impedance and cell rating. This embodiment may be implemented, for example, to reduce maintenance cost and improve system quality when new types and/or newly manufactured battery cells are introduced to an existing system and installed in combination with pre-existing batteries of the system. In this regard, one type of cell may be kept in production even for batteries which were developed in years past. Thus, the disclosed systems and methods may be implemented in one embodiment to achieve one or more benefits such as battery standardization that allows all vendors to build standard form factor battery pack solutions, freedom of upgrading with more options available for original equipment manufacturers (OEMs) to select battery cell technologies fitting the needs regardless of what battery cell technologies were started with, low maintenance cost since a BBU may be updated anytime with new battery cells such as when shipping is close to end of life or lower cost cells emerge, and/or battery placement flexibility since reduced dimensioned battery cells may be selected for placement within a system chassis wherever space is open.

In one exemplary embodiment, a battery system may be provided having the same input/output voltage on a shared power bus in a manner that is battery cell technology-independent such that different types of technologies and/or battery cell ages may be integrated into one battery system. Examples of different types of battery cells that may be so combined include different battery cell construction (e.g., cylindrical, prismatic, polymer, etc.), different battery cell rating (e.g., 2.0 Amp-hour, 3.0 Amp-hour, etc.), different type of battery chemistry (e.g., Lithium Cobalt Oxide(LiCoO2), Lithium Nickel Manganese Cobalt Oxide(NMC), etc.). In another exemplary embodiment, a battery system may be implemented in a manner that is cell-degradation-independent, e.g., regardless of aging factor or service/ storage time, BBUs are replaceable or interchangeable (as are individual battery cells of a given BBU) during entire product life.

In one respect, disclosed herein is an information handling system, including: a system load; a main power supply coupled by a power rail to supply power to the system load; a backup battery system coupled to the power rail to supply backup power to the system load, the backup battery system including: multiple separate battery cell units, the multiple separate battery cell units being coupled together in series or in parallel to provide the backup power for the battery system, and a separate processing device coupled to each given one of the battery cell units to control output voltage of the given battery cell unit separately from the output voltage of the other battery cell units while the backup battery system is providing the backup power to the system load.

In another respect, disclosed herein is a method of providing backup power to a system load of an information handling system, including: supplying power from a main power supply by a power rail to the system load; and supplying the backup power from a backup battery system coupled to the power rail to the system load in absence of power from the main power supply, the backup battery system including multiple separate battery cell units, the multiple separate battery cell units being coupled together in series or in parallel. The method may also include using a separate processing device coupled to each given one of the battery cell units to control output voltage of the given battery cell unit separately from the output voltage of the other battery cell units while the backup battery system is providing the backup power to the system load.

DESCRIPTION OF ILLUSTRATIVE EMBODIMENTS

Figure 1A:
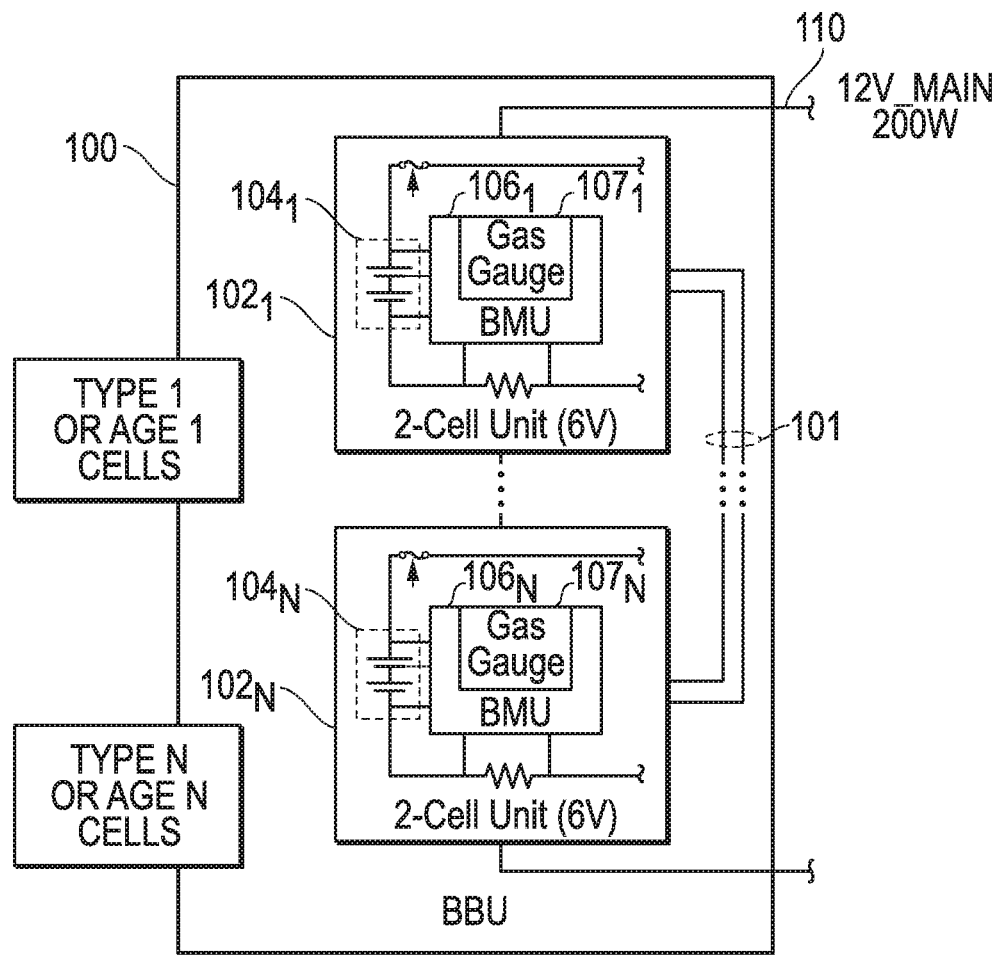
FIG. 1A illustrates a block diagram of a backup battery system according to one exemplary embodiment of the disclosed systems and methods.

FIG. 1A illustrates a backup battery system configured as a battery backup unit (BBU) 100 having multiple serial-connected battery subsystems $102_1$ to $102_N$ that each include a separate respective battery cell unit 104 containing one or more individual battery cells according to one exemplary embodiment of the disclosed systems and methods. In such an embodiment, a BBU 100 may include any number of two or more battery subsystems 102 that is suitable for a given application. As shown in FIG. 1A, each of given battery subsystems $102_1$ to $102_N$ includes a corresponding processing device (e.g. controller, microcontroller, processor, microprocessor, programmed logic device, etc.) configured as a battery management unit (BMU) 106 that is programmed to execute gas gauge processing logic 107 to perform power management tasks, battery health tasks and/ or battery management tasks for its given battery subsystem 102, e.g., such as determining and monitoring real time capacity or state of charge of battery cells within the battery cell unit 104 of the given battery subsystem 102, balancing the battery cells 104 of the given battery subsystem 102, etc. The BMUs $106_1$ to $106_N$ may be communicatively coupled by communication (e.g., GPIO) path 101 such as $I^2C$ or other suitable digital or analog (e.g., single analog line) communication (e.g., GPIO) path to allow BMUs 106 to communicate and/or be controlled in a closed-loop and coordinated manner to dynamically determine optimized output voltages for each battery subsystem 102 so as to achieve the required power output from BBU 100 such as described elsewhere herein. As further shown, serial-connected battery subsystems $102_1$ to $102_N$ of BBU 100 may be connected to supply backup power to a power rail 110 of an information handling system, e.g., in this case a 12 volt, 200 Watt main power rail although greater or lesser voltage and/or rail power ratings are also possible as selected or needed to fit the characteristics of a given BBU application.

Although FIG. 1A illustrates one battery system embodiment that employs communicatively-coupled and coordinated BMUs, it will be understood that in another embodiment it is possible that a BBU 100 may be configured with serially-connected serial-connected battery subsystems $102_1$ to $102_N$ as shown, but without the presence of a communication (e.g., GPIO) path 101. In such an embodiment, each of the separate BMUs $106_1$ to $106_N$ of each given battery subsystem 102 may be configured to operate independently using pre-defined voltage regulation parameters (e.g., such as maximum and/or real time BMU-monitored capacity of battery cells 104 of the given battery subsystem 102, target output voltage for the respective given battery subsystem 102, cell chemistry and cell cycle life performance, etc.) that are previously stored in system non-volatile memory that is accessible by each BMU 106. Such voltage regulation parameters may be predefined based on the battery system architecture characteristics of a given BBU 100 (e.g., total number of battery subsystems 102 present in the BBU 100, total target output voltage for the BBU 100, battery subsystem output voltage as a function of battery cell capacity, SOC, and/or cell chemistry, etc.), and may be used by logic executing on each BMU 106 to regulate the output voltage of its respective battery subsystem 102 to achieve the desired predefined operating output voltages for each battery subsystem 102 and target total output voltage for BBU 100. For example, assuming an alternative case in which BMUs $106_1$ to $106_N$ of serially-connected serial-connected battery subsystems $102_1$ to $102_N$ of FIG. 1A are not communicatively coupled together by communication (e.g., GPIO) path 101, then each of BMUs $106_1$ to $106_N$ may be configured to maintain a pre-defined output voltage (e.g., such as 6 volts output voltage in the case where N=2 and power rail target voltage is 12 volts) as backup power demand conditions vary on the power rail.

Figure 1B:
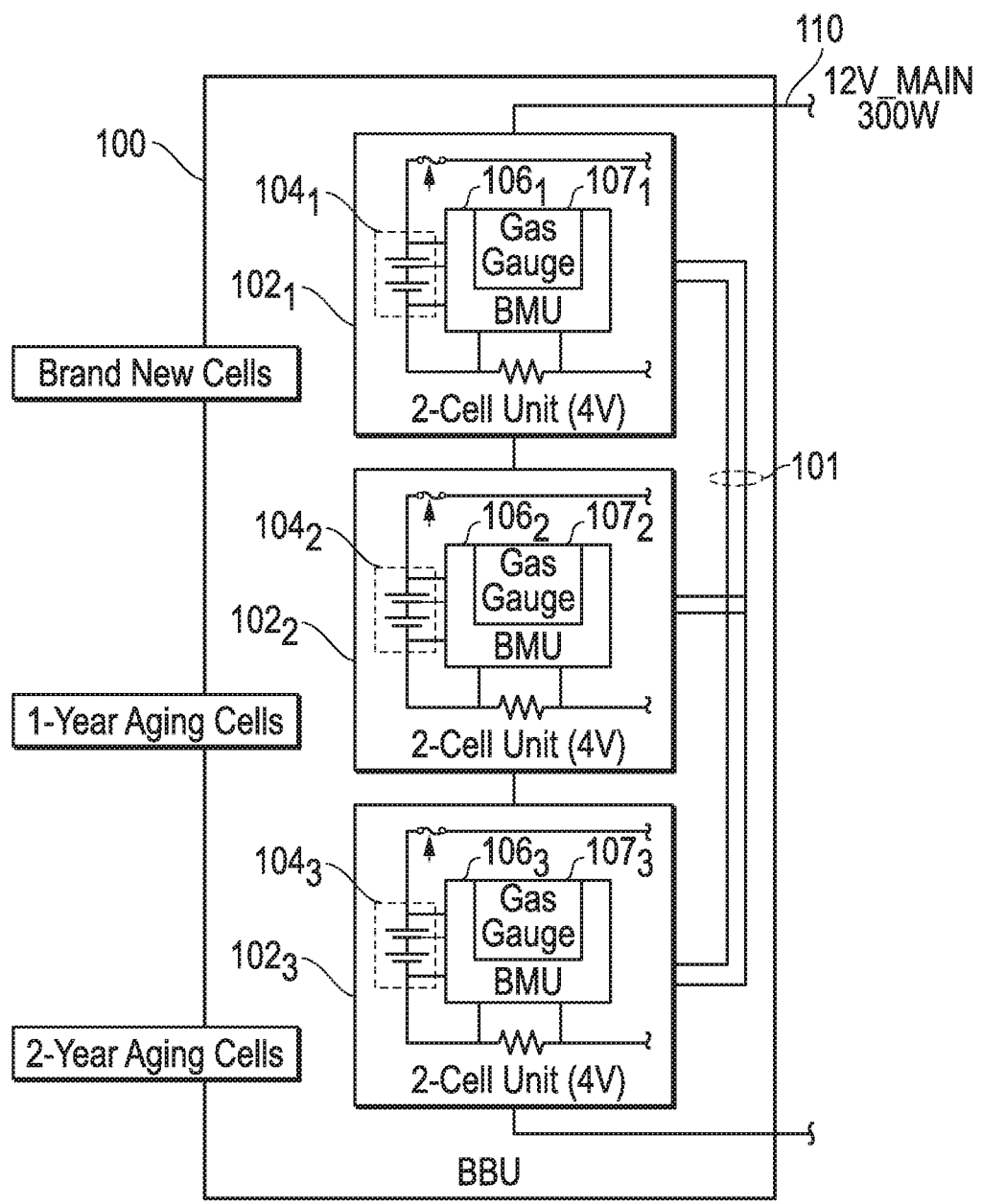
FIG. 1B illustrates a block diagram of a backup battery system according to one exemplary embodiment of the disclosed systems and methods.

In the illustrated embodiment of FIG. 1A, battery cells of battery cell unit $104_1$ of battery subsystem $102_1$ may be a different type and/or age of battery cell than the battery cells of battery cell unit $104_N$ of battery subsystem $102_N$. For example, battery cells of battery cell unit $104_1$ may be cylindrical-type cells that are one-year old, and battery cells $104_N$ may be polymer-type cells that are two-years old, etc. It will be understood that in other embodiments three or more battery subsystems 102 may be provided that each include different type and/or age of battery cells than the respective battery cells each of the other corresponding battery subsystems 102. In this regard, FIG. 1B illustrates a particular exemplary embodiment of a BBU 100 that includes three serial-connected battery subsystems $102_1$ to $102_3$ that are coupled to provide backup power to a 12 volt, 300 Watt main power rail 110 of an information handling system. In this embodiment, each of battery subsystems $102_1$ to $102_3$ include different aged battery cells that may be of the same or different types, e.g., battery cells of battery cell unit $104_1$ of battery subsystem $102_1$ are brand new, battery cells of battery cell unit $104_2$ of battery subsystem $102_2$ are one-year old, and battery cells of battery cell unit $104_3$ of battery subsystem $102_3$ are two-years old. In any case, different battery subsystems $102_1$ to $102_N$ of the disclosed embodiments may have different maximum output voltage and/or other electrical characteristics and capabilities due to the presence of different types and/or ages of battery cells within the respective different battery subsystems $102_1$ to $102_N$.

In one embodiment of the disclosed systems and methods, a BMU 106 of each given battery subsystem 102 of a given BBU 100 may be employed to control output voltage of its corresponding battery unit 102 in a coordinated manner with the respective BMUs 106 of the other battery subsystems 102 of the same BBU 100 using data and control communications between the individual BMUs 106 of the same BBU 100 across communication (e.g., GPIO) path 101. The BMU 106 of each battery subsystem 102 of a given BBU 100 may perform this task, for example, taking into account the number, type and other characteristics of battery cells of battery cell unit 104 of its own battery subsystem 102, together with a specified target total output voltage for the BBU 100 to a power rail such as illustrated in FIGS. 1A and 1B. In this regard, output voltage of each battery subsystem 102 may also be regulated as described elsewhere herein by its respective BMU 106 based on the type of battery cells of its battery cell unit 104, chemistry of these battery cells, aging factors of these battery cells, etc.

For purposes of illustration only, assume BBU 100 of FIG. 1A has two series-connected battery subsystems $102_1$ and $102_2$ with the same types of battery cells in respective battery cell units $104_1$ and $104_2$, it being understood that the same control methodology may be similarly employed with a BBU 100 have three or more series-connected battery subsystems 102 such as illustrated in FIG. 1B. In one embodiment, at least one of BMU $106_1$ and $106_2$ may be aware of the target 12-volt total output voltage from BBU 100 (e.g., by value stored in non-volatile memory coupled to BMUs 106 and/or via value provided across communication (e.g., GPIO) path 101). Further, at least one of BMUs $106_1$ and $106_2$ (and in one embodiment all BMUs 106) may also be aware of the presence of both battery subsystems $102_1$ and $102_2$, as well as battery cell characteristics (e.g., battery cell age, real time current capacity or SOC, battery cell type, etc.) of the battery cells of each battery cell unit $104_1$ and $104_2$ and/or the electrical capability (e.g., maximum voltage output rating) of each of the battery subsystems $102_1$ and $102_2$ via communication of this information across communication (e.g., GPIO) path 101. It will be further understood that in one embodiment all BMUs $106_1$ to $106_N$ may be aware of characteristics (e.g., age, real time current capacity or SOC, type, etc.) of the battery cells of all battery cell units $104_1$ to $104_N$ and/or the electrical capability (e.g., maximum voltage output rating) of each of the battery subsystems $102_1$ to $102_N$ via communication of this information across communication (e.g., GPIO) path 101.

Since at least one BMU 106 of BBU 100 is aware of the required output voltage for BBU 100 as well as the electrical capabilities and/or characteristics of each of the battery subsystems $102_1$ and $102_2$ of BBU 100, it may cause the output voltage for each of the battery subsystems $102_1$ and $102_2$ to be set so as to meet the target total output voltage for BBU 100 while at the same time keeping the output of each battery subsystem $102_1$ and $102_2$ at or below its rated maximum voltage. In this regard, one of BMU $106_1$ or $106_2$ may operate as a master to control the other BMU 106 to set the output of its battery subsystem 102 based on information received across communication (e.g., GPIO) path 101 from the BMU 106 of the other battery subsystem 102 of the same BBU 100. In another embodiment, each of BMU $106_1$ and $106_2$ may be aware of the target total output voltage, as well as the voltage capability/characteristics of each of battery subsystems $102_1$ and $102_2$. In this latter case, each BMU $106_1$ and $106_2$ may cooperatively control the output of its respective battery subsystem 102 based on information received across communication (e.g., GPIO) path 101 from the BMU 102 of the other battery cell 102 to achieve the target total output voltage for BBU 100 without exceeding voltage capabilities of its corresponding battery subsystem 102.

In one embodiment, each BMU 106 may be configured to adjust output voltage of its respective battery subsystem 102 downward due to age of battery cells of its respective battery cell unit 104, in which case at least one other BMU 106 may be configured to increase the output voltage of its respective battery subsystem 102 to compensate for the reduced output voltage of the other battery subsystem 102 in order to meet the target power rail output voltage for the BBU 100. Moreover, each BMU 106 may also be configured to adjust output voltage of its respective battery subsystem 102 upward or downward based on the particular actual required real time power rail output voltage for the BBU 100, e.g., such as to reduce output voltage of a 2.2 Ampere-hour (Ahr) capacity battery subsystem 102 from 12.3 volts to 12.15 volts when power demand from the 12 volt power rail drops from 50 watts to 25 watts.

In either of the above embodiments, each of battery subsystems $102_1$ and $102_2$ may be set in the illustrated embodiment by its respective BMU $106_1$ or $106_2$ to operate at 6 volts output for powering 12 volt main power rail of FIG. 1A. Alternatively, assume a case where BBU 100 of FIG. 1A has two series-connected battery subsystems $102_1$ and $102_2$ having different types of battery cells (e.g., battery cells of battery cell unit $104_1$ are cylindrical battery cells and battery cells of battery cell unit $104_2$ are polymer battery cells). In this case, battery subsystem $102_1$ may be set by BMU $106_1$ to operate at 6.5 volts output and battery subsystem $102_2$ may be set by BMU $106_2$ to operate at 5.5 volts output to deliver a total of 12 volts to main power rail of FIG. 1A in a manner that complies with regulatory requirements, e.g., without altering or eliminating the appropriate positive thermal coefficient switch for each battery cell unit 104 of battery subsystems $102_1$ and $102_2$.

In another example, assume a case where BBU 100 of FIG. 1B has serial-connected battery cell units, i.e., 4.1 volts battery cell unit $104_1$ are new (less than one year old), 4.0 volts battery cell unit $104_2$ are one-year aging (from one year to less than two years old), and 3.9 volts battery cell unit $104_3$ that are two-year aging (two years or greater years old). In the embodiment of FIG. 1B, battery system voltage is 12V. Each unit output voltage is coordinated though communication (e.g., GPIO) line 101 for system output voltage 12V.

Figure 2A:
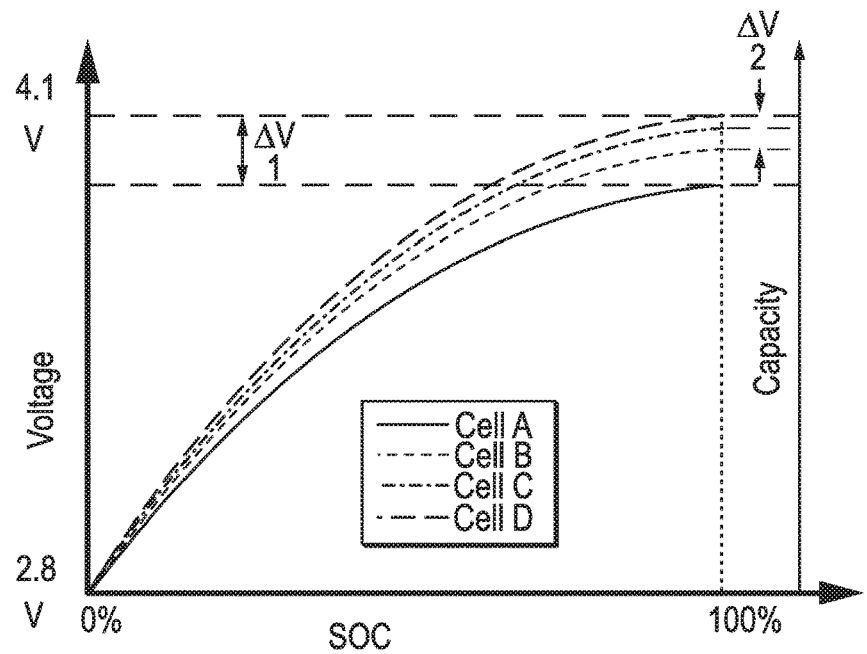
FIG. 2A illustrates voltage versus state-of-charge (SOC) for a conventional BBU.
Figure 2B:
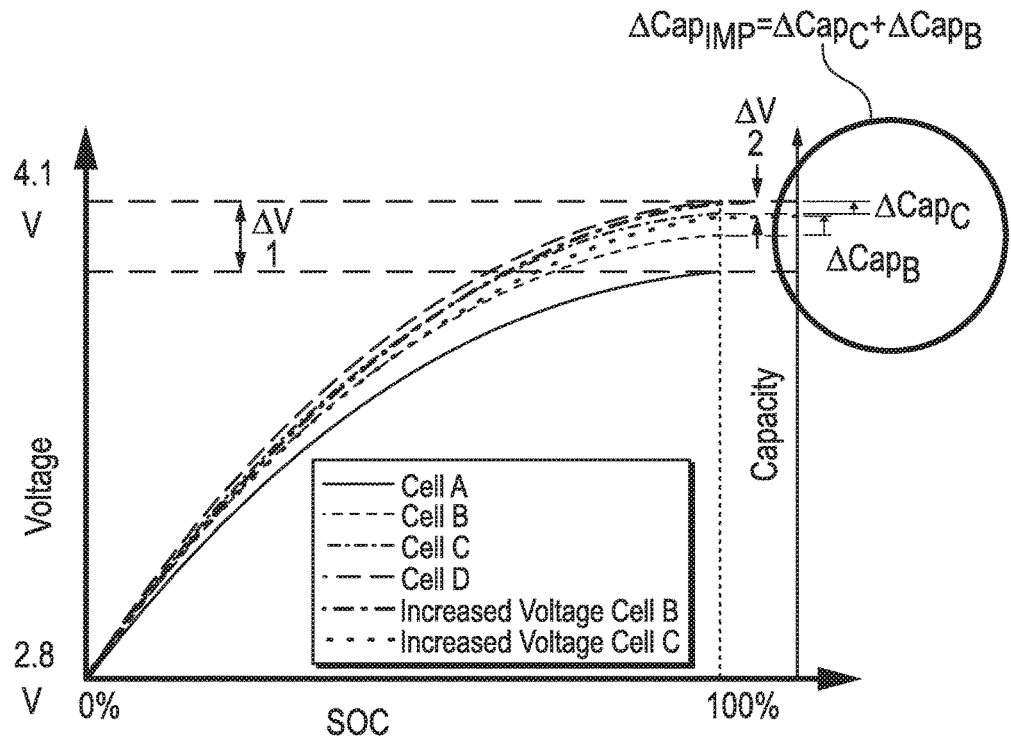
FIG. 2B illustrates voltage versus state-of-charge (SOC) for a BBU according to one exemplary embodiment of the disclosed systems and methods.

A comparison of FIGS. 2A and 2B illustrate an example of battery capacity improvements that may be realized for an exemplary BBU 100 having two serial-connected battery subsystems $102_1$ and $102_2$ such as illustrated in FIG. 1A. In this example, FIG. 2A illustrates voltage versus state-of-charge (SOC) for four battery cells A, B, C and D of a conventional BBU which employs a single string of four battery cells that are controlled together by a signal BMU. FIG. 2B illustrates voltage versus relative state-of-charge (SOC) for the same four battery cells A, B, C and D but this time as they may be implemented using two separately-controlled serial-connected battery subsystems $102_1$ and $102_2$ such as illustrated in the exemplary embodiment of FIG. 1A, i.e., with battery cells of battery cell unit $104_1$ of battery subsystem $102_1$ including two battery cells A and D, while battery cells of battery cell unit $104_2$ of battery subsystem $102_2$ include two battery cells B and C.

Due to cell imbalance issues, actual voltages of cells A, B, C and D vary with state of charge (SOC) as shown in FIGS. 2A and 2B. As shown in FIG. 2A, in the conventional configuration battery cells A and D have a voltage gap of $\Delta V1$, and battery cells B and C have a voltage gap of $\Delta V2$. In the conventional BBU configuration of FIG. 2A, charging stops when cell D reaches max changing voltage at 4.1V However, as shown in the two-battery subsystem embodiment of FIG. 2B, the voltage of battery cells B and C may be increased (labeled as "Increased Voltage Cell B" and "Increased Voltage Cell C" in FIG. 2B) as a function of relative SOC as compared to the conventional configuration of FIG. 2A. This capacity improvement is due to cell balancing between the A and D battery cells of battery cell unit $104_1$ of battery subsystem $102_1$ and the B and C battery cells of battery cell unit $104_2$ of battery subsystem $102_2$, i.e., charging continues for battery cell unit $104_2$ until Cell C voltage reaches 4.1V, while Cell D in battery cell unit $104_1$ reaches maximum charging cell voltage at 4.1V. The additional capacity gained in battery cell unit $104_2$ is realized by $\Delta CapC$ and $\Delta CapB$ because of extra change after battery cell unit $104_1$ charging termination. This capacity improvement may be expressed as a battery charge capacity improvement ($\Delta CapIMP$) that is equivalent to the increase in battery charge capacity of cell B ($\Delta CapB$)+increase in battery charge capacity of cell C ($\Delta CapC$) for the multi-battery subsystem BBU of FIG. 1A as compared to a conventional single-BMU BBU.

Figure 3:
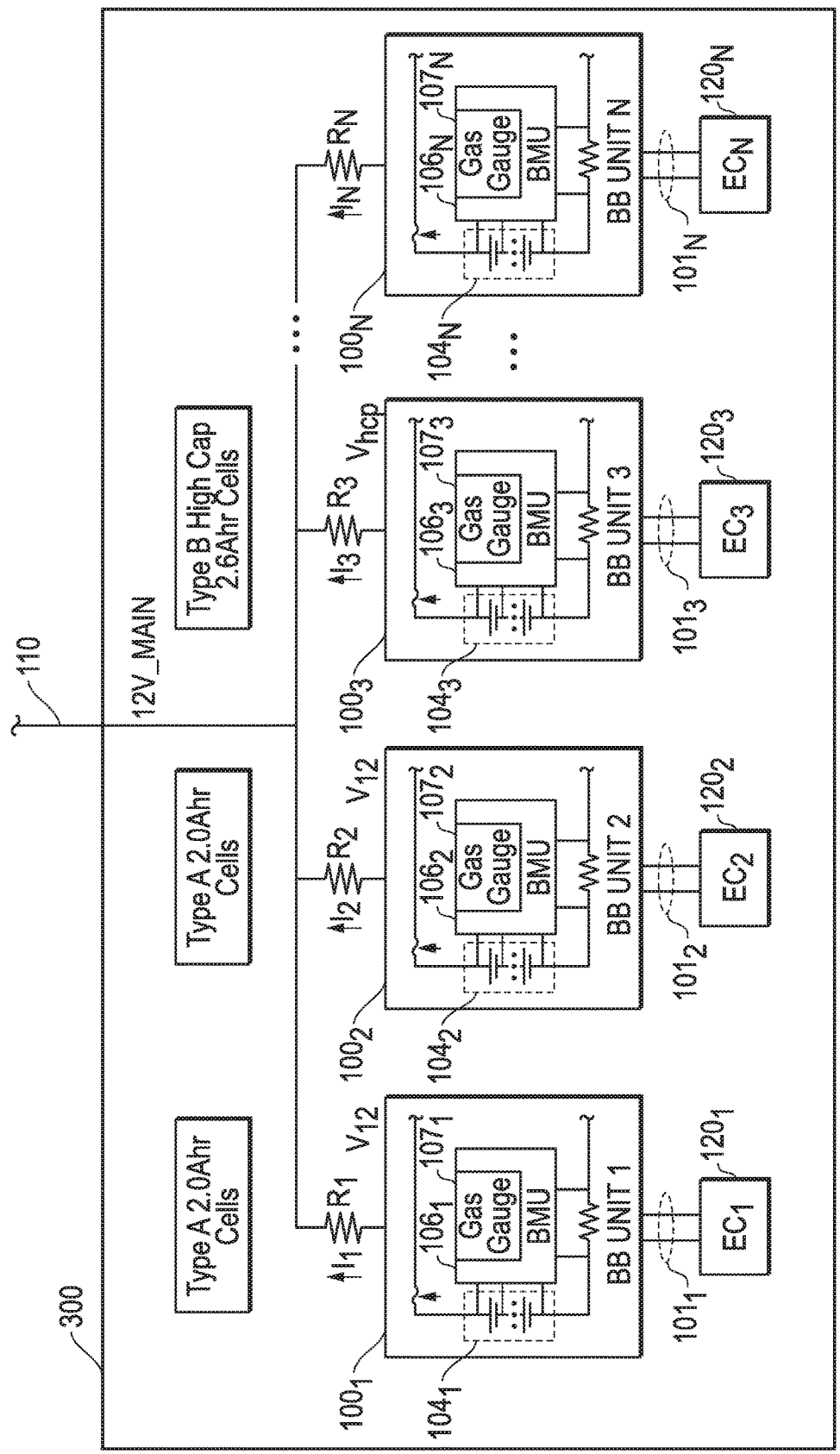
FIG. 3 illustrates a block diagram of a backup battery system according to one exemplary embodiment of the disclosed systems and methods.
Figure 6:
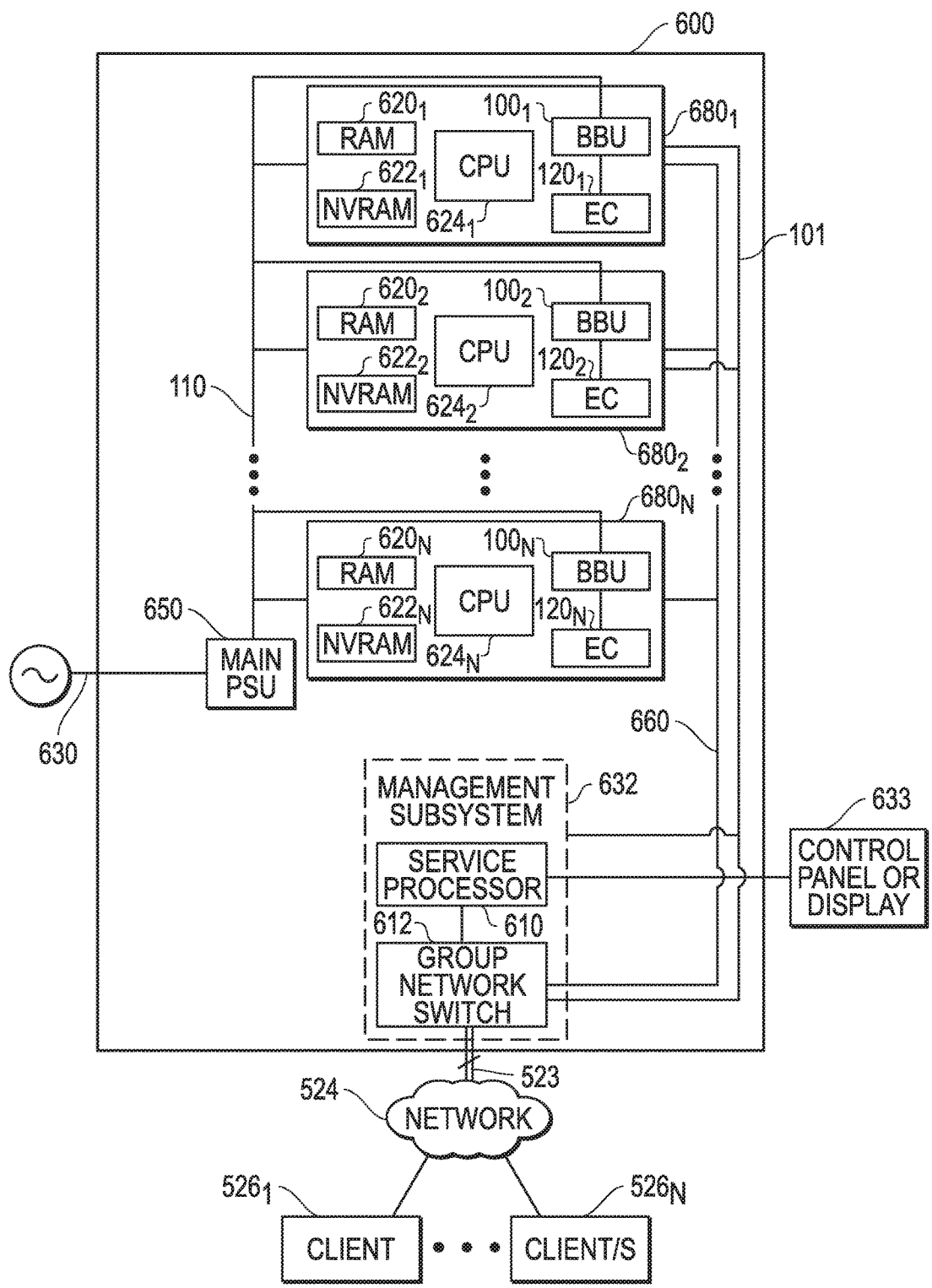
FIG. 6 illustrates a block diagram of an information handling system according to one exemplary embodiment of the disclosed systems and methods.

FIG. 3 illustrates an exemplary embodiment of a backup battery system 300 that includes multiple BBUs $100_1$ to $100_N$ that are coupled together in parallel to provide backup power currents $I_1$ to $I_N$ through resistances $R_1$ to $R_N$ (i.e., which represents individual impedances in each current path due to printed circuit board and cables) from battery cells that are separately provided for respective BBUs $100_1$ to $100_N$ as battery cell units $104_1$ to $104_N$, to a 12-volt main DC power rail 110 of an information handling system, e.g., such as blade server system 600 as illustrated and descried further herein in relation to FIG. 6. In the embodiment of FIG. 3, each of BBUs $100_1$ to $100_N$ includes a respective separate BMU $106_1$ to $106_N$. Each BBU 106 is coupled to monitor and control respective battery cells 104 of its respective BBU 100. In this regard, each of BMUs 106 may be programmed to execute gas gauge processing logic 107 to perform power management tasks, battery health tasks and/or battery management tasks, e.g., such as monitoring real time capacity of battery cells 104, balancing battery cells 104 etc. separately for the corresponding BBU 100. In one particular exemplary embodiment, backup battery system 300 may include eight BBUs $100_1$ to $100_8$ coupled to respective ECs $120_1$ to $120_8$, although less than or greater than eight BBUs/ECs may be provided in other embodiments.

In the embodiment of FIG. 3, BMUs $106_1$ to $106_N$ are communicatively coupled to respective separate embedded controllers (EC) $120_1$ to $120_N$ by separate communication (e.g., GPIO) paths 101, such as I$^2$C or/and other suitable communication (e.g., GPIO) path. In such a configuration, each of ECs 120 is coupled by a separate communication (e.g., GPIO) path 101 across which it may provide its corresponding BMU 106 with pre-defined voltage regulation parameters (e.g., such as maximum and/or real time capacity of battery cells 104, target output voltage for the respective given BBU 100, battery ENABLE signal parameters, etc.) that may be previously stored in system non-volatile memory that is accessible by each BMU 106 and/or EC 120. Although each BBU $100_1$ to $100_N$ of FIG. 3 is shown having a single BMU 106, it will be understood that it is also possible that one or more of BBUs $100_1$ to $100_N$ may be configured with multiple BMUs 106 and multiple corresponding battery subsystems 102, such as illustrated and described in relation to FIGS. 1A and 1B. In the embodiment of FIG. 3, each EC 120 (or system processing device coupled to the EC 120) may also disable and enable its respective BBU 100 through communication (e.g., GPIO) line 101, e.g., based on operation requirement or/and pre-defined parameters.

In the embodiment of FIG. 3, each BMU 106 may independently control voltage output of the battery cells 104 of its respective BBU 100 based on the pre-defined voltage regulation parameters provided by its respective coupled EC 120. Such voltage regulation parameters may be predefined based on the architecture of battery system 300 (e.g., total number, voltage and/or capacity of BBUs 100 present in system 300; total target output voltage from battery system 300 to the 12-volt system power rail, BBU output voltage as a function of battery cell capacity and/or SOC, over current protection thresholds for each BBU unit, etc.). Voltage regulation parameters may then be used by logic executing on each BMU 106 to regulate the output voltage of its respective BBU 100 in a closed-loop manner to achieve the desired predefined operating output voltages for each BBU 100 as a function of the current battery capacity and/or SOC of the battery cells 104 of the respective BBU 100.

For example, in one embodiment the architecture of the disclosed systems and methods may be employed to support both current sharing and concurrent use of different battery cell technologies to achieve extended battery system life.

Thus, when two or more types of battery cells 104 are presented in one battery system such as system 300 of FIG. 3, higher output voltage/current may be set by predefined default output voltage values (e.g., stored directly in BMU or EC memory, calculated using an algorithm, or both) that is accessible by each of BMUs 106 and/or system ECs 120, or alternatively through a communication path (e.g., I²C bus) adjustments by system ECs 120 for optimized performance in alignment with system impedance and cell rating. Table 1 illustrates example BBU output voltage/current values that may be stored in memory (e.g., as a lookup table) and used in one embodiment by each given BMU 106 for controlling output voltage/current of its respective BBU 100 in system 300 of FIG. 3 based on remaining capacity or SOC of its respective battery cells 104 as determined by the corresponding gas gauge 107 of the given BMU 106. Two example cases are given, one for 12-volt main power rail application, and one for 5-volt main power rail application. It will be understood that in one embodiment ECs $120_1$ to $120_N$ of FIG. 3 may be in communication with each other (e.g., via a communication (e.g., GPIO) path, in which case ECs $120_1$ to $120_N$ may use to coordinate with each other to achieve real time control. However, in another embodiment ECs $120_1$ to $120_N$ may employ pre-defined parameters to work independently from each other to achieve real time control.

TABLE 1

| Remaining Battery Capacity (Ahr) | BBU Output Voltage/Current for 12 Volt Power Rail | BBU Output Voltage for 5 Volt Power Rail Application |
| --- | --- | --- |
| 2.0 | 12.0 volts/2.0 A | 5.0 volts/2.0 A |
| 2.2 | 12.0 volts/2.2 A | 5.0 volts/2.2 A |
| 2.4 | 12.0 volts/2.4 A | 5.0 volts/2.4 A |
| 2.6 | 12.0 volts/2.6 A | 5.0 volts/2.6 A |

As an example, one or more of battery cells $104_1$ to $104_N$ of respective BBUs $100_1$ to $100_N$ may be different type cells. In one embodiment, voltage regulation parameters may be predefined and employed by ECs 120 and/or BMUs 106 to ensure that highest output voltage and most (or all) current is provided by the BBU 104 having the highest capacity (e.g., Ahr) battery cells 104 of all the multiple BBUs $100_1$ to $100_N$. To illustrate, assume there are only three parallel-connected BBUs $100_1$ to $100_3$ illustrated in the embodiment of FIG. 3, with battery cells $104_1$ of BBU $100_1$ and battery cells $104_2$ of BBUs $100_2$ each being 2.0 Amp-hour (Ahr) rated cells, while remaining battery cells $104_3$ of BBU $104_3$ being 2.6 Ahr rated cells. In this example, each of BBUs $100_1$ and $100_2$ may be operated to have an output voltage of 12 volts (V12) while BBU $100_3$ is operated to have an output voltage (Vhcp) that is greater than 12 volts (e.g., such as about 12.3 volts). In one embodiment, independent action and control of ECs $120_1$ to $120_3$ may be used to select higher output voltage Vhcp for BBU $100_3$ to preferentially provide backup power to the system power rail using adjustments made by BMUs $106_1$ to $106_3$ to achieve optimized performance in alignment with system impedance (e.g., $R_1$, $R_2$ and $R_3$) and battery cell ratings of battery cells $104_1$ to $104_3$.

In one embodiment, BBUs $100_1$ to $100_N$ of battery system 300 of FIG. 3 may be operated in constant voltage (CV) output mode during periods of time that output power of BBU $100_3$ is less than its maximum output power limit, in which case the output current $I_3$ of BBU $100_3$ will be higher than output currents $I_1$ and $I_2$ of BBUs $100_1$ and $100_2$ given respective output current path impedances $R_1$ to $R_3$ and the higher output voltage (Vhcp>12 volts) of BBU $100_3$ relative to 12 volt output voltages of BBUs $100_1$ and $100_2$. In such an embodiment, when BBU $100_3$ reaches its maximum output power limit, BBUs $100_1$ to $100_3$ may be controlled to transition to constant current (CC) output mode during which output current $I_3$ of BBU $100_3$ may be controlled to either be equal to the output currents $I_1$ and $I_2$ of BBUs $100_1$ and $100_2$, or alternatively may be controlled to be higher than output currents $I_1$ and $I_2$ of BBUs $100_1$ and $100_2$. In the latter case, target output power values for each BBU may be set to be proportional or otherwise based on its Ahr cell rating relative to the Ahr cell rating of the other BBUs of system 300, i.e., such that $I_3$ of 2.6 Ahr BBU $100_3$ is controlled to be greater than output currents $I_1$ and $I_2$ of 2.0 Ahr BBUs $100_1$ and $100_2$. In this way, battery life of the lower-rated 2.0 Ahr battery cells $104_1$ and $104_2$ may be extended by limiting the battery energy output (i.e., (voltage V)×(current I)×(time T)) of the lower Ahr rated BBUs $100_2$ and $100_2$, while at the same time the battery life of the higher-rated 2.6 Ahr battery cells $104_3$ of BBU $100_3$ may be kept within design range.

Figure 4:
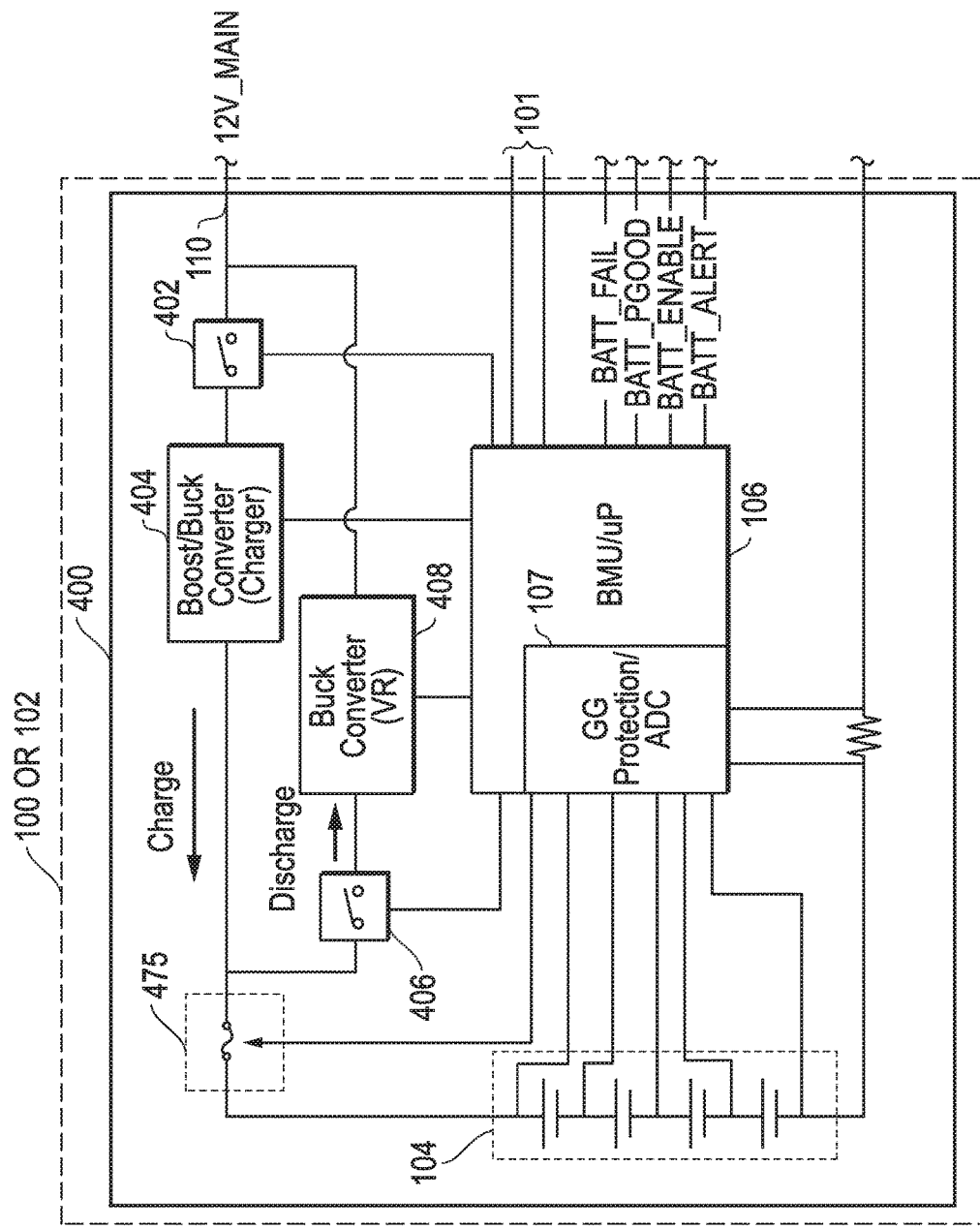
FIG. 4 illustrates a block diagram of charge and discharge circuitry according to one exemplary embodiment of the disclosed systems and methods.

FIG. 4 illustrates a block diagram of charge and discharge circuitry 400 as it may be employed to utilize a BMU microprocessor 106 to implement gas gauge logic 107 and control of charging current, discharging current, and output voltage of battery cells 104 of a battery subsystem 102 or BBU 100 of the backup battery systems of FIGS. 1-3. As shown, circuitry 400 includes switching elements (e.g., MOSFETS) 402 and 406, charging boost converter 404 and discharging current DC-DC voltage regulation (VR) circuitry in the form of a buck converter 408. Also shown present is inline fuse 475 that may be present to prevent over-charging of battery cells 104. Further information on examples of voltage regulation and charge and discharge circuitry 400 may be found in U.S. Pat. No. 7,595,609 and United States Patent Application Publication No. 2015/0318685, each of which is incorporated herein by reference in its entirety for all purposes.

Figure 5:
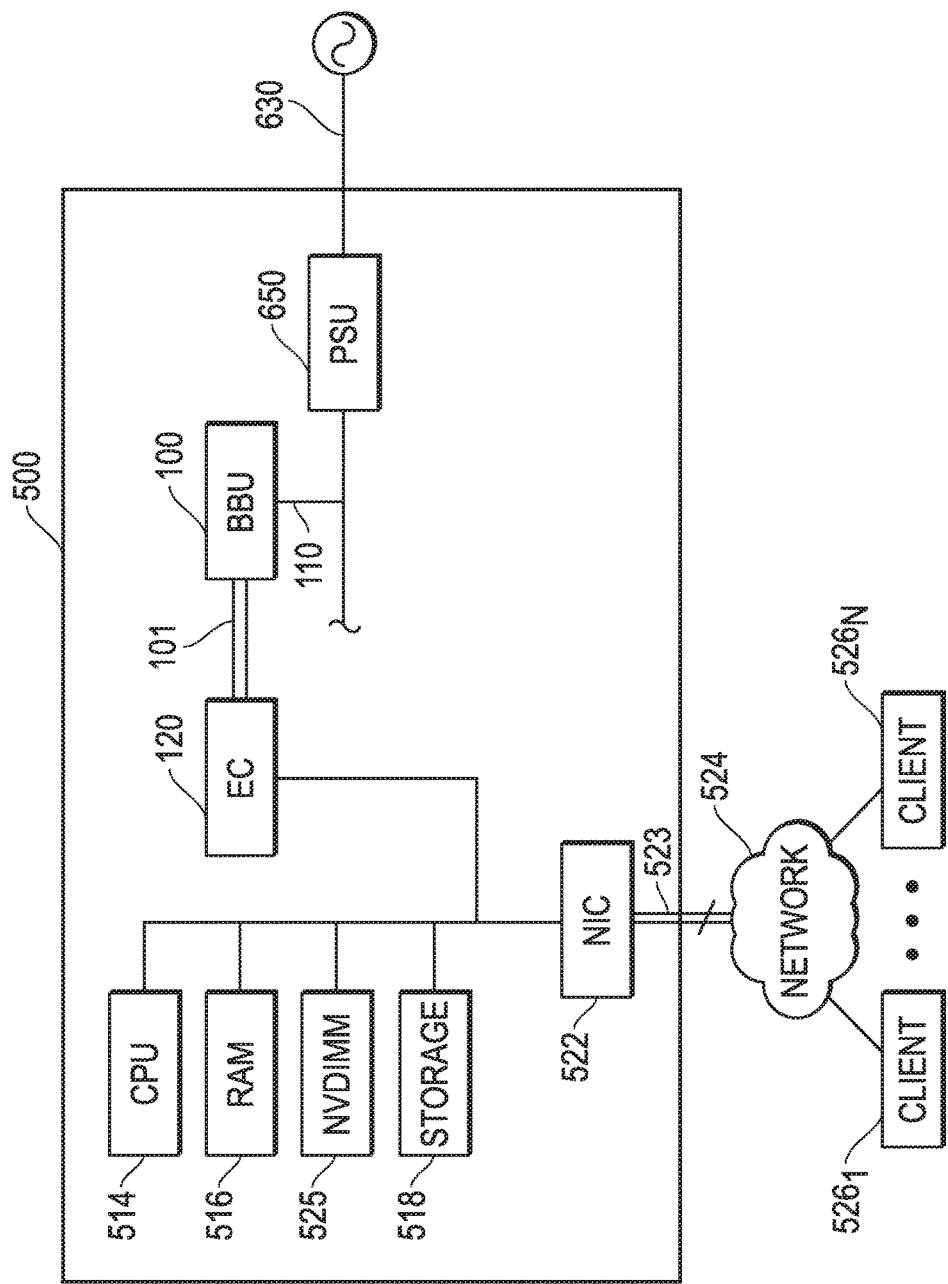
FIG. 5 illustrates a block diagram of an information handling system according to one exemplary embodiment of the disclosed systems and methods.

FIG. 5 illustrates an exemplary embodiment of an information handling system 500 configured as a server that may include a BBU 100 such as illustrated and described in relation to FIGS. 1A and 1B. In this embodiment, server 500 may include host processing device (CPU) 514, system memory (RAM) 516, storage 518 (e.g., a hard disk or solid state drive), system non-volatile memory 525, at least one network interface card (NIC) 522. In one embodiment, host processing device 514 and other components of server 500 may be configured to perform one or more information processing and/or network routing tasks, e.g., for client information handling systems $526_1$ to $526_N$ communicatively coupled to server 500 by network 524 through network bus 523. As shown in FIG. 5, server 500 also includes an embedded controller 120 (e.g., baseboard management controller (BMC) microcontroller, service processor or other suitable processing device, etc.) that is coupled to the BBU 100 and other components of the server 500. A main power supply unit (PSU) 650 is coupled by a main DC power rail 110 as shown between AC mains 630 and power-consuming system load components of server 500 (e.g., including CPU 514, system memory 516, storage 518, system non-volatile memory 525, EC 120, NIC 522, etc.) as well as BBU 100. BBU 100 is coupled to obtain charging power across the main power rail from PSU 500 and to supply backup power to components of the system load via main DC power rail 110 upon failure or loss of power from AC mains 630. In this regard, BBU 100 may be activated to supply backup power under such power failure/loss conditions under the control of system controller, either through digital communication line(s) or analog GPIO(s) 101. It will be understood that the disclosed systems and methods may be implemented with a variety of other types of information handling systems besides servers, e.g., desktop computers, etc. Further information on server component architectures may be found in U.S. Pat. No. 8,995,670, which is incorporated herein by reference in its entirety.

FIG. 6 illustrates an exemplary embodiment of an information handling system 600 configured in the form of a server rack system 600 that includes blade servers $680_1$ to $680_n$, that include respective BBUs $100_1$ to $100_N$ that are coupled together in parallel in the manner of the embodiment of FIG. 3 to provide backup power current to system load components (e.g., power-consuming components of blade servers $680_1$ to $680_n$. and management subsystem 632) via main DC power rail 110, and to receive charging current from main DC power rail 110. As shown in FIG. 6, each of blade servers $680_1$ to $680_n$, includes at least one respective central processing unit (CPU) 624 executing an in-band (e.g., host) operating system (OS) and at least one respective EC 120 (e.g., such as baseboard management controller) executing out-of-band programming and coupled to the corresponding CPU 624 of the same blade server 680. Each of blade servers $680_1$ to $680_n$ also includes random access memory (RAM) 620 and non-volatile random access memory (NVRAM) 622 that may be present for purposes of saving and/or retrieving information used by the corresponding CPU 624 and/or EC 120 of the same blade server 680. Besides EC 120, it will be understood that any other suitable out-of-band processing device (e.g., service processor, embedded processor, etc.) may be employed to perform out-of-band operations using one or more out-of-band processing devices that are separate and independent from any in-band host central processing unit (CPU) that runs the host OS of the information handling system, and without management of any application executing with a host OS on the host CPU.

As further shown in FIG. 6, server rack system 600 may include a management subsystem 632 that includes an embedded service management processor 610 (e.g., such as a BMC microcontroller or any other suitable type of processing device) together with a network switch 612 that interfaces with external entities across network 624, e.g., Internet, corporate intranet, etc. Processor 610 may be optionally coupled to a control panel or display 633 as illustrated. As shown, each blade server 680 is configured to communicate with one or more client information handling system/s 526 via network 524 and network switch 112 through communication bus 523. As further shown, BBUs $100_1$ to $100_N$ may be optionally coupled together in communication by communication (e.g., GPIO) path 101, and may be optionally coupled by communication (e.g., GPIO) path 101 to communication with other devices such as management subsystem components 632 although this is not necessary. In the illustrated embodiment of FIG. 1, server rack system 600 also includes a main power supply unit (PSU) that receives AC mains power 630, performs AC/DC power conversion, and provides DC power by main DC power supply rail 110 to the system load which includes power-consuming components of each blade server 680 (e.g., CPU 624, EC 120, system RAM 620 and NVRAM 622, etc.) and power-consuming components of management subsystem 632 (e.g., processor 610, network switch 612, etc.). Further information on blade server components and architectures may be found in U.S. Pat. No. 8,843,772, which is incorporated herein by reference in its entirety for all purposes.

It will also be understood that one or more of the tasks, functions, or methodologies described herein for an information handling system or component thereof (e.g., including those described herein for components 100, 101, 102, 106, 107, 120, 514, 610, 612, 624, 650, etc.) may be implemented using one or more electronic circuits (e.g., central processing units (CPUs), controllers, microcontrollers, microprocessors, hardware accelerators, FPGAs (field programmable gate arrays), ASICs (application specific integrated circuits), and/or other programmable processing circuitry) that are programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For example, one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processor such as CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be processing devices selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   a system load;
   a main power supply coupled by a power rail to supply power to the system load;
   a backup battery system coupled to the power rail to supply backup power to the system load, the backup battery system comprising:
      multiple separate battery cell units, the multiple separate battery cell units being coupled together in series or in parallel to provide the backup power for the battery system, and
      a separate processing device coupled to each given one of the battery cell units to control output voltage of the given battery cell unit separately from the output voltage of the other battery cell units while the backup battery system is providing the backup power to the system load;
   where each given one of the separate processing devices is coupled by a communication path to exchange one or more battery cell characteristics of its given respective battery cell unit to which it is coupled with each of the other separate processing devices; and where each of the separate processing devices is configured to separately control output voltage of its given respective battery cell unit to which it is coupled based at least in part on the battery cell characteristics of the other battery cell units coupled to the other separate processing devices that is provided by the other separate processing devices across the communication path.

2. The information handling system of claim 1,
   where the multiple separate battery cell units are coupled together in series and/or in parallel to provide the backup power for the battery system, and
   where each separate processing device is a given separate programmable circuit coupled to each given one of the battery cell units and programmed to control output voltage of the given battery cell unit separately from the output voltage of the other battery cell units while the backup battery system is providing the backup power to the system load, the given separate programmable circuit coupled to each given one of the battery cell units being different from the programmable circuit coupled to each of the other battery cell units.

3. The information handling system of claim 2, where each of the separate programmable circuits of the backup battery system is programmed to:
   determine the real time current remaining battery capacity of a given one of the battery cell units separately from the other battery cell units; and
   control output voltage of the given battery cell unit separately from the output voltage of the other battery cell units based on the determined real time remaining battery capacity of the given battery cell unit while the backup battery system is providing the backup power to the system load.

4. The information handling system of claim 2, where the multiple battery cell units are coupled together in series to provide the backup power for the battery system.

5. The information handling system of claim 2 where the information handling system is a blade server system comprising multiple server blades coupled to the power rail to receive power from the main supply power; where the system load comprises power-consuming components of the multiple server blades; where each of the server blades comprises a battery backup unit (BBU) that is coupled in parallel to each of the BBUs of the other server blades to form the backup battery system; where the multiple BBUs of the battery system together provide the backup power to the system load that includes the power-consuming components of the multiple server blades; and where the separate programmable circuit of each of the BBUs comprises an embedded controller (EC) and/or battery management unit (BMU) that is different from the separate programmable circuit of each of the other BBUs.

6. The information handling system of claim 2, where each of the separate programmable circuits is programmed to control output voltage of a given battery cell unit independently from the other separate programmable circuits that are programmed to control output voltage of the other battery cell units.

7. The information handling system of claim 1, where the one or more battery cell characteristics comprise at least one of battery cell age or battery cell type.

8. The information handling system of claim 2, where each given one of the separate programmable circuits of the backup battery system is programmed to:
   receive pre-defined voltage regulation parameters from a different programmable circuit and/or non-volatile memory that is coupled to the given separate programmable circuit; and
   use the received pre-defined voltage regulation parameters to control at least one of output voltage or output current of the given battery cell unit in a closed-loop manner that is separate from the control of other battery cell units by logic executing on other and different respective programmable circuits.

9. The information handling system of claim 8, where the given separate programmable circuit coupled to each given one of the battery cell units comprises a given battery management unit (BMU) and where the different programmable circuit comprises an embedded controller (EC); where the pre-defined voltage regulation parameters comprise predefined operating output voltages for the given one of the battery cell units as a function of the current battery capacity and/or state of charge (SOC) of the battery cells of the given battery cell unit; and where each given BMU is programmed to receive the pre-defined voltage regulation parameters from the EC, and to use the received pre-defined voltage regulation parameters to regulate the output voltage of the given battery cell unit in a closed-loop manner in a manner that is separate from the control of other battery cell units by logic executing on other and different respective programmable circuits to achieve the predefined operating output voltages for the given battery cell unit as a function of the current battery capacity and/or SOC of the battery cells of the given battery cell unit.

10. A method of providing backup power to a system load of an information handling system, comprising:
supplying power from a main power supply by a power rail to the system load; and
supplying the backup power from a backup battery system coupled to the power rail to the system load in absence of power from the main power supply, the backup battery system comprising multiple separate battery cell units, the multiple separate battery cell units being coupled together in series or in parallel; and
using a separate processing device coupled to each given one of the battery cell units to control output voltage of the given battery cell unit separately from the output voltage of the other battery cell units while the backup battery system is providing the backup power to the system load;
where the method further comprises using each given one of the separate processing devices to exchange one or more battery cell characteristics of its given respective battery cell unit to which it is coupled with each of the other separate processing devices across a communication path; and using each of the separate processing devices to separately control output voltage of its given respective battery cell unit to which it is coupled based at least in part on the battery cell characteristics of the other battery cell units coupled to the other separate processing devices that is provided by the other separate processing devices across the communication path.

11. The method of claim 10,
where the multiple separate battery cell units are coupled together in series and/or in parallel; and
where the method further comprises using a given separate programmable circuit coupled to each given one of the battery cell units to execute logic to control output voltage of the given battery cell unit separately from the output voltage of the other battery cell units while the backup battery system is providing the backup power to the system load, the given separate programmable circuit and its corresponding executing logic that is coupled to each given one of the battery cell units being different from the programmable circuit and corresponding executing logic coupled to each of the other battery cell units.

12. The method of claim 11, further comprising using each given one of the separate programmable circuits to execute logic to:
determine the real time current remaining battery capacity of a given one of the battery cell units separately from the other battery cell units; and
control output voltage of the given battery cell unit separately from the output voltage of the other battery cell units based on the determined real time remaining battery capacity of the given one of the battery cell units while the backup battery system is providing the backup power to the system load.

13. The method of claim 11, where the multiple battery cell units are coupled together in series to provide the backup power for the battery system.

14. The method of claim 11, where the information handling system is a blade server system comprising multiple server blades coupled to the power rail to receive power from the main supply power; where the system load comprises power-consuming components of the multiple server blades; where each of the server blades comprises a battery backup unit (BBU) that is coupled in parallel to each of the BBUs of the other server blades to form the backup battery system; where the given separate programmable circuit of each of the BBUs comprises an embedded controller (EC) and/or battery management unit (BMU) that is different from the separate programmable circuit of each of the other BBUs; and where the method further comprises using the multiple BBUs of the battery system to together provide the backup power to the system load that includes the power-consuming components of the multiple server blades.

15. The method of claim 11, further comprising using each of the given separate programmable circuits to execute logic to control output voltage of a given battery cell unit independently from the other separate programmable circuits that separately execute logic to control output voltage of the other battery cell units.

16. The method of claim 11, further comprising using the given separate programmable circuit coupled to each given one of the battery cell units to:
execute logic to receive pre-defined voltage regulation parameters from a different programmable circuit and/or non-volatile memory; and
use the received pre-defined voltage regulation parameters to control at least one of output voltage or output current of the given battery cell unit in a closed-loop manner that is separate from the control of other battery cell units by logic executing on other and different respective programmable circuits.

17. The method of claim 16, where the given separate programmable circuit coupled to each given one of the battery cell units comprises a given battery management unit (BMU) and where the different programmable circuit comprises an embedded controller (EC); where the pre-defined voltage regulation parameters comprise predefined operating output voltages for the given one of the battery cell units as a function of the current battery capacity and/or state of charge (SOC) of the battery cells of the given battery cell unit; and where the method further comprises using the given BMU coupled to each given one of the battery cell units to execute logic to received the pre-defined voltage regulation parameters from the embedded controller (EC), and using the received pre-defined voltage regulation parameters to regulate the output voltage of the given battery cell unit in a closed-loop manner in a manner that is separate from the control of other battery cell units by logic executing on other and different respective programmable circuits to achieve the predefined operating output voltages for the given battery cell unit as a function of the current battery capacity and/or SOC of the battery cells of the given battery cell unit.

18. The method of claim 10, where the one or more battery cell characteristics comprise at least one of battery cell age or battery cell type.

19. The method of claim 10, further comprising:
supplying the backup power from the backup battery system coupled to the power rail to the system load in absence of power from the main power supply, and while the backup battery system comprises a first group of multiple separate battery cell units, the multiple separate battery cell units of the first group of battery cell units being coupled together in series or in parallel;

then supplying the backup power from the backup battery system coupled to the power rail to the system load in absence of power from the main power supply, and while the backup battery system comprises a second group of multiple separate battery cell units, the multiple separate battery cell units of the second group of battery cell units being coupled together in series or in parallel, and the second group of battery cell units including at least one battery cell unit having battery cell characteristics that are different from the battery cell units of the first group of multiple separate battery cell units;

using each given one of the separate processing devices to exchange one or more battery cell characteristics of its given respective battery cell unit to which it is coupled with each of the other separate processing devices across a communication path; and using each of the separate processing devices to separately control output voltage of its given respective battery cell unit to which it is coupled based at least in part on the battery cell characteristics of the other battery cell units coupled to the other separate processing devices that is provided by the other separate processing devices across the communication path such that each of the separate processing devices separately control output voltage of its given respective battery cell unit based on the battery cell characteristics of the battery cell units of the first group of multiple battery cell units in a different manner than each of the separate processing devices separately control output voltage of its given respective battery cell unit based on the battery cell characteristics of the battery cell units of the second group of multiple battery cell units.

20. The method of claim 19, where the one or more battery cell characteristics comprise at least one of battery cell age or battery cell type.

\* \* \* \* \*